US005997928A

United States Patent [19]

Kaish et al.

[11] Patent Number: 5,997,928

[45] Date of Patent: Dec. 7, 1999

[54] METHOD AND APPARATUS FOR VERIFYING CONTENTS OF VENDING SYSTEMS

[75] Inventors: Norman Kaish, West Hempstead; Calmon Cozer, Flushing, both of N.Y.

[73] Assignee: Fast Food Factory, Inc., Syosset, N.Y.

[21] Appl. No.: 09/030,429

[22] Filed: Feb. 25, 1998

Related U.S. Application Data

[60] Provisional application No. 60/038,505, Feb. 25, 1997.

[51] Int. Cl.[6] .......... A23L 1/00

[52] U.S. Cl. .......... 426/418; 99/325; 99/334; 99/352; 99/355; 99/357; 99/467; 221/135; 221/155; D20/4

[58] Field of Search .......... 426/399, 407, 426/418; 99/352, 325, 334, 355, 467, 450.1, 357; D20/4; 221/135, 150 R, 150 A, 150 HC, 155

[56] References Cited

U.S. PATENT DOCUMENTS

| | | | |
|---|---|---|---|
| 3,035,886 | 5/1962 | Hickey | 426/399 X |
| 3,561,395 | 2/1971 | Piersma et al. | 340/406 X |
| 3,852,737 | 12/1974 | Gordon | 340/274 R |
| 4,117,465 | 9/1978 | Timblin | 340/545 |
| 4,593,361 | 6/1986 | Otten | 364/479 |
| 5,121,677 | 6/1992 | Le Claire et al. | 99/357 |
| 5,207,784 | 5/1993 | Schwartzendruber | 221/6 |
| 5,522,310 | 6/1996 | Black, Sr. et al. | 99/357 |

*Primary Examiner*—Milton Cano
*Attorney, Agent, or Firm*—Milde, Hoffberg & Macklin, LLP

[57] ABSTRACT

A method and apparatus designed to insure the integrity of food and food service in vending cart. Specifically, disclosed is a system that ensures the integrity of the food will not be compromised, by providing an enclosed or environmentally protected food service station, either portable, mobile or stationary. The system may also provide food monitoring for security, time, temperature and transaction accounting. The system consists of an enclosed or environmentally protected food service station, a sealed food compartment in which food is served, a food storage compartment, an access door for providing service and cleaning to the sealed sections of the station, and optionally an integrated security system that ensures that all access doors and ports are monitored for access and integrity. The security system provides an alarm and reporting capability. Authorization codes are provided to control alarm reset and accounting features of the system.

27 Claims, 8 Drawing Sheets

METHOD AND APPARATUS FOR VERIFYING CONTENTS OF VENDING SYSTEMS

This application claims the benefit of priority of U.S. Provisional Patent Application No. 60/038,505, filed Feb. 25, 1997.

FIELD OF INVENTION

The present invention relate to the field of vending apparatus, and more particularly to food vending apparatus with security and accounting features.

BACKGROUND OF THE INVENTION

Vending apparatus of various types are known. These include coin and code operated food vending machines, automats, and the like. In these known vending systems, an item, for example, food or beverage, is selected by a user. Coin, currency, card or codes are used to account for the value of the delivered item. Typically, food items are delivered at room temperature or cooled. Systems also provide for warmed foods and beverages to be dispensed.

Standards related to maintaining food integrity in most food service applications are restricted to providing cold storage and or a clean working environment. While these are fundamental requirements apply to the entire food service industry, vendors who wish to comply with strict dietary laws or special dietary preferences, e.g., kosher laws, must additionally meet more stringent and different standards. Specifically, some rabbinical councils have historically had trouble providing inspection and assurances of koshrus (inspection to assure that the kosher dietary laws have been met) for venders of fast food from mobile carts. The problem with compliance to these standards, which includes supervision by approved and trained individuals, is that unlike fixed location restaurants that are under the supervision of religiously trained personnel, food service carts may be moved from one location to another or are too small to support the cost of a required supervisor to oversee that all food is prepared, served and maintained according to kosher laws, without substitution with unkosher or unapproved foods.

It is known to add alarm systems to vending machines, to provide an alert in cases of vandalism. In addition, coin boxes, bill changers and the like may be provided with locks and/or codes to prevent pilferage by unauthorized persons during maintenance and servicing. Typically, however, the food contents itself of the vending machine is not tightly guarded to prevent pilferage or tampering by those with a low authorization level for access to the device, and in fact, these devices are often intended to be supplied and internally serviced by persons with "casual" access to the system, and usually without a high level of security clearance, e.g., a restocking clerk with a key.

Known systems do not allow for security over the food and food handling systems, such as to ensure a freedom from unauthorized tampering and hygienic lapses. Therefore, in these known systems, a low level of access to the system allows direct contact with the foods or beverages and the associated portions of the device. Therefore, in these systems, the "authorized" user is also the normal user of the system, thus preventing a high degree of centralized control over use of the device.

The problems detailed above have to date made it impossible for some reputable organizations that certify supervision that kosher dietary laws are observed, to provide seals of approval for portable or small establishment food venders. The invention and systems detailed herein will solve these dilemmas and overcome problems that have caused some religious organizations to shy away from issuing a "hashgacha" or seals of approval that certifies that correct supervision is being provided. The primary solution that the invention provides is that it restricts access to all food and food preparation areas including those for supply and refill, except by authorized trained supervisory personnel and yet still allows serving personnel the ability to sell and serve food without direct access to these restricted areas.

Glove hoods are known devices for isolation of internal and external environments. Typically, these hoods are provided in the case of toxic or infectious material, on the one hand, and sterile or sensitive materials on the other, within the hood. Such systems are not regularly used for food preparation and distribution systems. These glove hoods may have air lock apertures to permit the insertion or extraction of materials into or out of the hood.

Turnstiles are a known mechanism for providing unidirectional movement of objects.

SUMMARY AND OBJECTS OF THE INVENTION

The present invention therefore provides a system having at least two levels of authorized use, the normal use of the apparatus to release goods and a supervisor mode with access to food and internal mechanism. In an "unmanned" or automated vending environment, the user mode provides for replacement of secure food distribution cartridges, while the supervisor mode permits loading of food cartridges.

Therefore, the present invention permits the supervisor user to have complete control over pre-sale access to the food, and therefore to maintain strict supervision over the goods, regardless of the actions of the normal user. The normal user is the on-site vendor, or in the case of an automated vending machine, the customer. This remote supervision capability therefore provides increased accountability and assurances for both the supervisor and the end recipient of the food. This, in turn, allows less reliance on the integrity of the normal user, permitting greater efficiencies in the selection of vendor personnel, and more creative accounting schemes for subsidization of the costs involved in providing the mobile vending apparatus, pricing and availability of particular predicts, and compensation of the vendor personnel.

The present invention therefore provides the capability for inspectors to issue certifications of purity and or compliance with religious or other dietary laws or preferences for small and portable (mobile) food service carts. It also is an improvement over existing food service carts where food is maintained and or served in an area open to bacteria and other negative environmental issues.

The apparatus according to the present invention therefore provides a secure cartridge or cabinet holding items prior to transaction, to which the normal user does not have unrestricted access. During a transaction, one or more items are dispensed, optionally heated, cooled or otherwise prepared, and then provided to the customer without direct human contact. The normal user, if present, is responsible for operation of the device, including control over manual preparation steps, if required and supported, and the selection and accounting for sales. In an automated environment, the customer may make selections from a user interface.

The present invention therefore provides assurances to the user that the food is untainted and "pure" to the standard of the supervisor user.

The present invention also provides automation and control for food warming and cooling, which helps assure safe food handling practices. Thus, the food cartridge or cabinet may be held at refrigerated temperatures for those foods which are served cold or subject to spoilage. The refrigeration temperature may be monitored, with abnormal deviation resulting in an alarm. This alarm may be a local alarm to the user, for example to add more ice, or a permanent alarm where the temperature is outside a safe range for an extended period. A permanent alarm cannot be self resetting or reset by the user, and therefore the supervisor mode is necessary to clear this condition. In many instances, grossly abnormal or unsafe conditions are also indicated to the customer, to allow the customer to avoid the purchase and/or consumption, and to be assured that where the alarm is inactive, the product meets the required conditions. In other instances, the alarm is not presented to the end user, for example waning battery life. Thus, where the food is at an abnormal storage temperature, the reuse of the stored product may be contraindicated, while the vending of the same over a short term period may be acceptable.

Likewise, the food preparation may involve a heating step. The control system may therefore control this heating in a desired manner. While dietary laws do not normally prescribe heating protocols, public health considerations and regulations often do prescribe the heating and holding of foods. Therefore, many foods require a minimum heating temperature for cooking, a minimum hold temperature (for a limited duration), and the like. With various heating methods (convection, microwave, steam, radiant, and/or a combination of methods), the three dimensional heating profile through the food may differ, and therefore the temperature measurement at a point or surrounding the food may not be indicative of a "core" temperature of the food. The control system may therefore implement a heating protocol based on a set of rules, involving the nature and amount of the food, the heating method and starting temperature, cooking preferences, and optional sensor or sensor systems.

The security of the food vending system provides substantial opportunities for full accountability for sales. Therefore, the vendor need not be highly trusted to report all sales and to sell only authorized goods. Since the vending system is fully accounted (at least on a supply bases, and potentially on a revenue basis as well), the system may be financed based on sales, allowing low cost of entry for a vendor-entrepreneur. Further, the system may provide a wireless telecommunications link, such as for credit card verifications, allowing electronic commerce applications. This reduces the cash-on-hand of the vendor, reducing the attractiveness of this individual as a target for theft. Electronic sales also facilitate impulse purchases at a higher dollar volume than cash sales, and allow a relatively higher cost per unit item and average transaction amount. While credit card transactions are obviously a prime candidate for implementation, personal and corporate charge accounts without involvement of a credit card clearinghouse may also be provided. The wireless link may also be used to transmit inventory levels, device status codes, location (via, e.g., a GPS receiver to determine location). With knowledge of geographic sales profiles, a sophisticated inventory management scheme may be implemented, to provide appropriate stock for particular "neighborhoods". When stocks run low, the location of a mobile vending system may be determined, and automatically scheduled for restocking. The location encoding wireless transmitter also allow tracking of stolen mislocated vending systems.

The food vending system may have separate compartments for different food types, such as kosher (meat), kosher (diary), vegetarian and beverages. Therefore, separate vending apertures may be provided. In one embodiment of the invention, customers are coded for the particular applicable dietary laws or preferences, and a control system provides advice for compliance based on the customer code. This coding may also be used to assist a user in compliance with restricted or special diets, such as caloric, sodium, allergen, or other types of restrictions. In this case, customer accounts provide intake monitoring and suggestions. Likewise, with complete separation of vending system portions, incompatible foods may be stored and vended simultaneously.

The vending system provides secure storage, typically below or above a food preparation component. While the food preparation component is optional, its use adds significant value to the vending transaction. The food preparation may be the aforementioned cooking or heating, but also more complex preparation, such as making a sandwich with select condiments. While sandwich preparation may be performed in advance, or condiments provided in separate portion control packaging, custom sandwich preparation is often desirable. To make a sandwich, the bread (or roll) and main ingredients are first dispensed into the preparation area. The main ingredients, e.g., meat, cheese etc., are provided in portion control servings. Vegetables, such as lettuce, tomato and onion may be portion controlled or liberally available to the vendor. The vendor is, for example, provided with gloves extending into the food preparation chamber to allow manipulation of the foods without direct contact. Condiments may be delivered from dispensers, also within the chamber. After a sandwich is prepared, it is wrapped or boxed, and moved to an exit portion of the preparation area, and hence delivered to the customer without manual contact or risk of manual contact. The exit is preferably a turnstile or other unidirectional exit whereby objects are restricted from passing from outside into the chamber.

After a sandwich is delivered, the food preparation chamber, which is, for example, a glove box, may be cleaned, for example by a water (or disinfectant) jet or clean cycle. These cycles may be intermittent, and need not be after every transaction. Further, the food preparation chamber may have ultraviolet lights to kill bacteria therewithin. In this case, the chamber is fabricated or a material which blocks ultraviolet leakage and which has acceptable life under such illumination conditions. The gloves of the glove box which extend into the chamber may also be overlayed with disposable food handling gloves, which may be disposed after use.

Alternatively or in addition, the food preparation area may be formed as a plastic film, which is then used as a wrapper for the food. Therefore, soiling of the chamber is minimized. Advantageously, the plastic film is provided as a wrapper for at least one of the food ingredients, such as the roll or equivalent portion. Therefore, waste is minimized.

The system allows a fine level of accounting for food ingredients and a large variety and number of permutations. To the extent that the vending system provides a large number of ingredients, an automated storage and retrieval system may be provided as a space efficient solution to inventory management.

The food storage cabinets or cartridges provide a new means for stocking of vending systems. The food is stocked in a secure environment, and thereafter dispensed in single servings. These cabinets or cartridges preferably each have a lock and tamper evident design. The cabinets or cartridges also preferably have an electronic interface to the vending system, for example to control dispensing, monitor temperature, sense tampering, and provide for inventory management. The electrical connections are preferably standardized and modular, so that cartridges are interchangeable and provide encoding for contents and control parameters. Thus, menu variations may be provided by selection of cartridges, with automated communication with the control system. Further, a menu may be electronically displayed on the vending system, based on the available inventory. Further, pricing may be time and demand sensitive, with higher prices for more popular items and during peak hours, and discounts toward the close of business to liquidate excess inventory. These pricing variations may be adaptively controlled to optimize revenues and profits, while avoiding parasitic sales.

By monitoring temporal and spatial (geographic) details of sales, the distribution and shift timing of vending locations may be optimized as well. With a communications network, additional factors may also by communicated and accounted for, such as weather forecasts, special events, and the like, which may influence optimization of pricing, selection and vending system location.

In order to maintain the food integrity, the cart has a control system which may be an integrated multiple task controller or a distributed control system. The control system may be, for example, an embedded controller, PDA or PC-compatible computer system. The control system provides a user interface, data acquisition system for security, food condition sensors, and the like, inventory control and management system, food dispensing control, telecommunications or database communication, financial accounting, and location (position) sensing.

The present invention also facilitates first-in-first-out inventory management. Thus, oldest stock may be selectively dispensed before new stock. This stock rotation is controlled by the controller, based on the order of food packages within the cabinet or cartridges. Potentially, the packages may be encoded with data codes, to assure freshness of food.

According to one embodiment of the invention, a bar code or UPC code scanner is provided to read codes present on the food packaging. These codes may include the normal UPC codes, which identify the manufacturer and product code, and may also include a separate label which provides further information, such as inspector, supervisor, expiration or freshness date, and the like. This scanner may be a laser scanner, CCD (linear or image), CID or other known type. The scanned information may be used for inventory management, billing, and stock verification.

The controller preferably includes the following functions:

1) Cash register

2) Inventory control

3) Temperature control

4) Security and status monitoring system

5) Communications system for communicating transactional data, inventory status data, and cart conditional status.

Each time the user activates a transaction, e.g., by depressing a key on a user interface keyboard, the system registers and displays the item selected (and its cost), and at the conclusion of a set o transactions for the same customer, prints out a receipt and stores the items used for the set of transactions. This information is used in the inventory database sub-system.

A sensor system is preferably provided to monitor inventory status. For example, the cart may have sensors located at each refrigerated food slot, a signal being sent for each item being removed for warm-up. Another sensor system may be located at the exit door from the food preparation enclosure, and each time the user activates the door to deliver food, the system registers and stores the transaction's time and date. By this method, the system keeps a strict control of the inventory. Further sensors may be provided to identify jams and other abnormal operations, and to monitor normal mechanical processes and system status. If a jam is identified, an automated remediation system may be activated, or specific exception processing employed. In order to maintain the integrity of the refrigerated food storage area, manual remediation of jams is to be avoided. Therefore, the food conveyor system preferably has a fail-safe design and facilities for expedited error recovery. In one embodiment, food items which are abnormally positioned within the device are flushed to a lower capture tray, below the conveyor system, and a new food item then presented to the food preparation chamber.

Alternately, the food storage chamber consists of a set of "cubbies" in which the food is stored, accessible to the user by use of the gloves in the glove box. In this case, no automated conveyor is provided, but rather the sensors detect withdrawal of the food from the cubby.

In one embodiment, the food comprises, for example, frankfurters and frankfurter rolls, with a variety of condiments. In this case, the frankfurters are stored cold in multiple serving bags. The user manually lifts a bag containing, e.g., ten frankfurters, from cold storage into a warmer, which is, for example, a microwave-convection oven. After warming, a single frankfurter is removed from the warmer and placed on a roll. The vendor then adds condiments as requested by the customer, for example, chili, sauerkraut, ketchup, mustard, and the like. The user then wraps the frankfurter in a paper or tissue wrapper, which is then placed adjacent to a turnstile device. The user then activates the turnstile to withdraw the food from the preparation area. When the frankfurters are all dispensed in like manner, a new bag is withdrawn from the storage area into the food preparation area for warming.

When a multiple serving package, for instance, of frankfurters is withdrawn, a sensor detects the removal. Where a conveyor is provided, a new package of frankfurters is moved to the extraction position. As each prepared frankfurter is expelled through the turnstile, and additional sensor detects this event. If frankfurters are the only food available, then each activation of the sensor indicating removal of a multiple serving package is accounted as ten servings. As each serving is sold and extracted, a single sale is accounted. The supervisor may then determine the number of packages prepared and the number of servings delivered, providing a simple basis for ensuring that the appropriate amount of money has been collected. If a variety of foods are available, or, for example, certain condiments are sold at extra charge, the accounting system and inventory management is somewhat more complex.

Beverages may be manually or automatically delivered, preferably through a separate delivery system, not passing through the food preparation chamber. Again, an inventory and accounting management system ensures accountability.

As discussed above, a number of sensor are also provided to ensure safe and appropriate food storage and preparation conditions, most notably temperature. Thus, in addition to sensing the presence of foods in various portions of the system, the system may also sense food temperature (e.g., below 3C in refrigerated storage area and between 75–85C in warmer), and timers may be implemented to ensure that food is not spoiled, stale or old. When such undesirable or unsafe conditions occur, the food may be discarded, blocked from delivery to the user and/or customer, or an alert or alarm condition initiated. A waste area accessible from within the food preparation area may be provided for disposal of foods, and sensors or manual accounting may be employed to account for such waste food to provide a comprehensive inventory and sales accounting.

In order to inhibit bacterial growth, the system preferably provides refrigeration or cooling for the food storage area, and continuously monitors the temperature in the storage and warming compartments. In case of too high a temperature in the storage area, or inappropriate temperature in the warming area, an alarm may be activated.

Food integrity is an important consideration in the present system and method. The vending system preferably has sensors located in a variety of locations including the cooled storage compartment door, food preparation chamber cover (preferably formed of a clear plastic, such as Plexiglas® or acrylate polycarbonate), air lock door(s), optional turnstile, gloves lock, etc. Special electrical wiring may be added to the gloves to monitor tampering or leakage, in known manner, e.g., as presently employed in certain surgical gloves and hazmat glove boxes. Any intrusion is registered by the computer, an alarm is activated, e.g., via visual indicator lights visible to the customer, audio and/or telecommunications system. A secure algorithm or secret code is used to disarm the alarm and enable the loading of food into the cart, as well as to rearm the system for continued security. Preferably, a rolling code security system is implemented to provide enhanced security over a static code while providing simple and efficient operation. The rolling code may be transmitted by radio frequency, infrared, or keypad. While physical key or combination lock may be used, such key or lock is preferably part of a security system which also involves a code which is input and analyzed electronically.

The code may also be transmitted or communicated through a voice interface or a biometric detection interface, such a fingerprint, retinal, hand shape, facial image, and the like.

It is therefore an object according to the present invention to provide a method and system designed to insure the integrity of food and food service in or at a food service station, either portable, mobile or stationary whereby the food is protected from tamper, replacement, or substitution by unauthorized personnel. The system may, for example, consist of:

a) a food service station;

b) a segregated and sealed food compartment in which food is prepared or served;

c) a system for secured access from outside the secure area for handling the food and supplies; and d) a system for secure exit of food from the restricted preparation area whereby said food may exit out while preventing outside food from entering the secure area.

It is also an object according to the present invention to provide a method and system including lock boxes or cartridges used for replacing food inventory, and or a locked access door for providing service and cleaning to the sealed sections of the station.

It is a further object according to the present invention to provide a method and system for providing security that ensures that all access doors and ports are monitored for unauthorized access and system integrity. The security system preferably includes an alarm and reporting capability that can only be electronically reset by authorized personnel.

It is another object according to the present invention to provide an apparatus and system designed to insure the integrity of food and food service in or at a food service station, being portable, mobile or stationary whereby the food is protected from tamper, replacement, or substitution by unauthorized personnel. The systems consist of:

a) a food service station;

b) a segregated and sealed food compartment in which food is prepared or served;

c) a secured access system for receiving food from the secure area for handling and/or preparing the food and supplies, while preventing outside food from entering the secure area.

These and other objects will become clear through a review of the drawings and detailed description of the preferred embodiments.

BRIEF DESCRIPTION OF THE DRAWINGS

The invention will now be explained by reference to the drawings, in which.

DETAILED DESCRIPTION OF THE INVENTION

Figure 1:
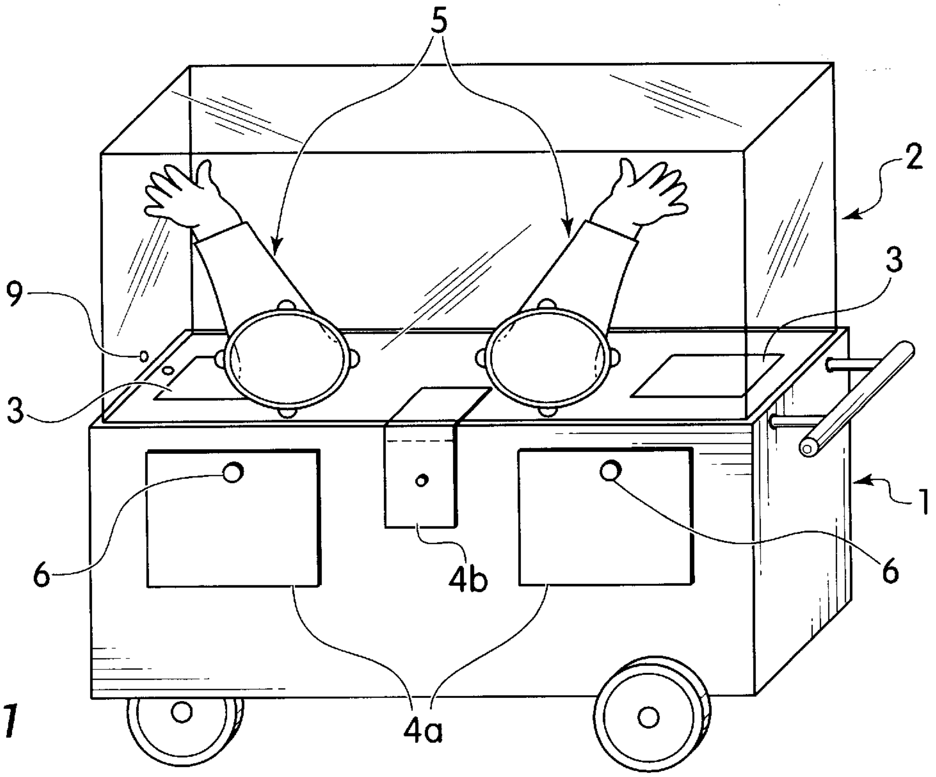
FIG. 1 is a front perspective view of the vending system according to the present invention.
Figure 2:
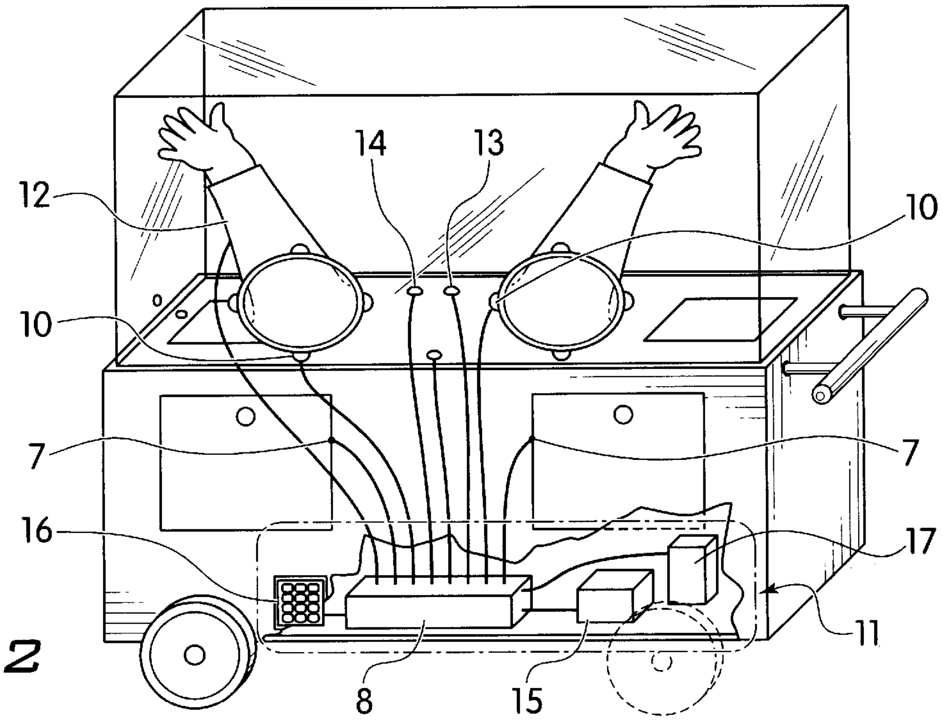
FIG. 2 is a semischematic view of the vending system showing elements of the control and security system of the embodiment shown in FIG. 1.

Referring to FIG. 1, there is shown a vending station with secure heating and or cooling sections for food storage and preparation constituting the first aspect of the present invention. The vending cart 1 has a locked enclosed top serving area 2 consisting of a see through plastic or glass enclosure in which food is prepared for service to the customer. Preferred plastics include Plexiglas®, acrylate or polycarbonate. If glass, the glass is preferably tempered.

Food supplies are provided by feed access ports 3 that are connected directly to locked supply bins 4A. These supply binds 4A may be stocked directly by the supervisor, or supplied in replaceable cartridges. The replaceable cartridges (not shown in the drawings) may have security features to prevent tampering, while interfacing with the vending system to allow normal operation. The food, after preparation, exits through a one way tray/door assembly 4B. This exit point is designed in such a way as to prevent the supply or otherwise entry of food into the serving area 2, yet still allow passage of the food from the serving area to outside the cart (the customer). In the preferred embodiment, the server personnel either uses glove box gloves and sleeves 5 to manipulate the foods from outside the cart in its enclosed food preparation area or manually operated mechanical arms or manipulators similar to those of a robot or those currently used to handle hazardous nuclear materials. Alternatively, automated machine assembly can be utilized in cases where the motions for food preparation are repetitive. The cart has locks 6 on each entry door that could allow access to the food. Each door is monitored by a sensor 7 sufficient in designed to provide a signal to an alarm and monitoring system 8 that oversees security for the cart. Additionally, the see through cover lock 9 and glove/manipulator retaining security screws 10 may be tied to into the security system 11. The gloves 12 of the glove box may have special wiring circuits to detect cuts in the glove that could allow access to, or contamination of, the food preparation area.

In a typical application of the invention, a kosher supervisor oversees and/or loads the food bins 4 at a central facility. The empty food bins are unlocked and removed from the cart by the supervisor. Newly filled bins or sealed bags will be inserted and locked into the cart by the supervisor. Following the locking, the security system may be self-arming or a reset code, known only to the supervisor, is entered into the keypad 12 of the electronic security alarm and monitoring system. Once reset and armed, a green status light 13 indicates that the monitoring system is enabled and that no breach has occurred. In the event that the security system is breached by the opening of doors or the tripping of security sensors, a red light 14 will flash. The system is designed to inform the supervisor of a breach in a secure manner and to deter the food server from substituting food or gaining access to a restricted area without the supervisor in attendance or without supervisor approval. Resetting of the red light alarm condition is only possible by entry of the secret security code, which is known only to the supervisor.

Optionally, the security system interfaces to a transmitter 15 with an antenna. A breach of security signal, along with an identification of the particular vending system, is sent to a remote center to enable a quick detection and appropriate response to this condition.

Figure 3:
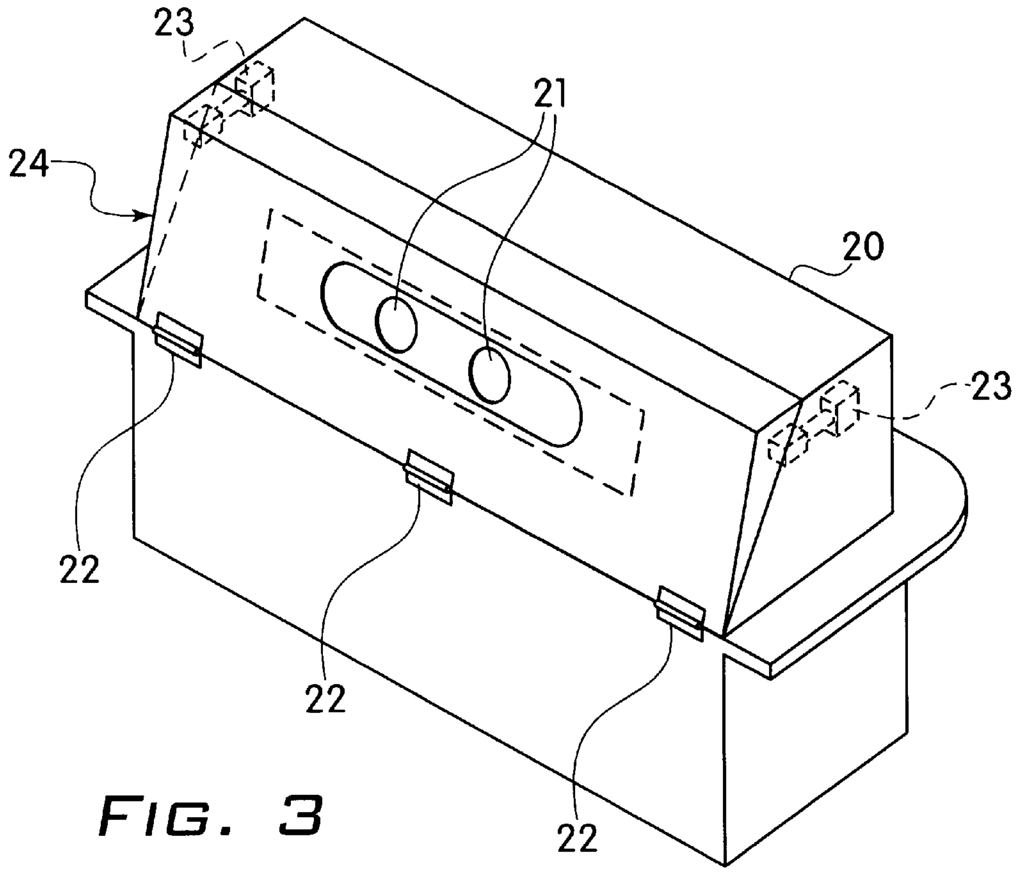
FIG. 3 is a top perspective view of a vending system according to the present invention showing an access door to the food preparation area.

As shown in FIG. 3, an embodiment is provided in which the glove box 20 is provided with adjustable arm hole 21 positioning by means of slide plate 25. Further, the relative intrusion of the arms in the arm holes 21 mounted on a moveable enclosure portion 24 is adjustable, by means of hinges 22 and spring mechanisms 23.

Figure 4:
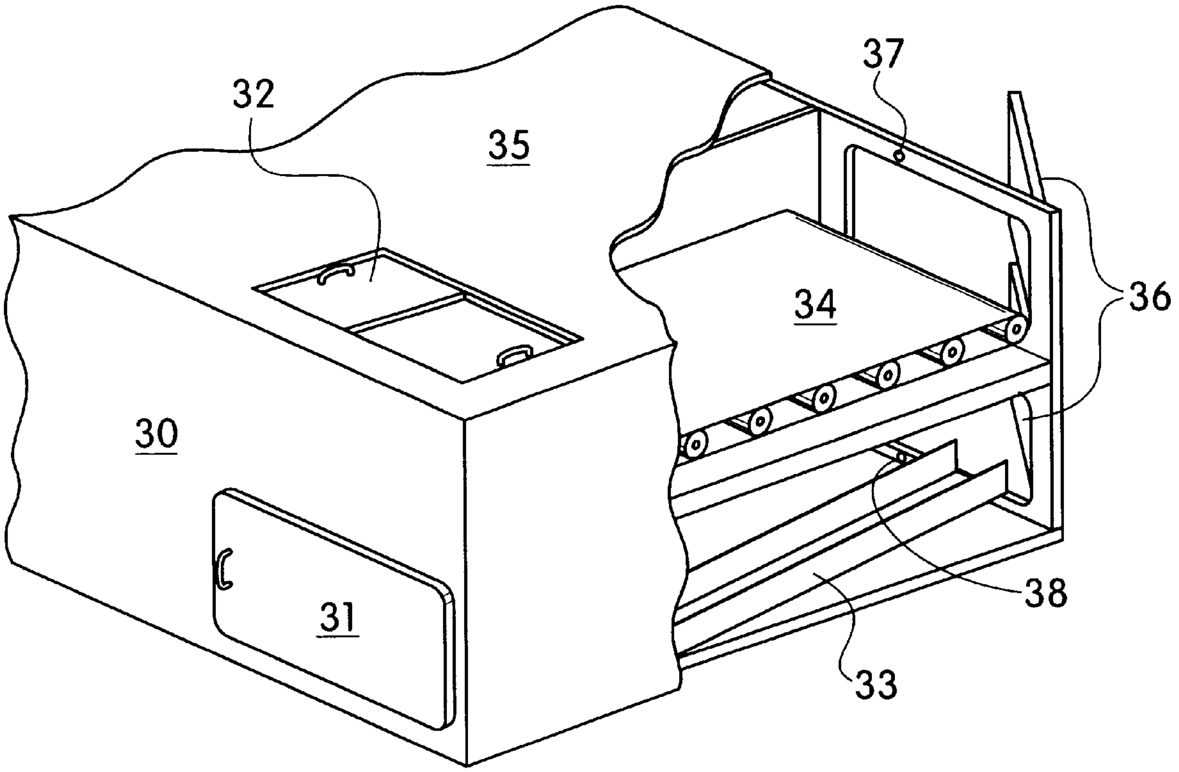
FIG. 4 is a side perspective partial cutaway view of a food storage and conveyor system.

As shown in FIG. 4, an embodiment of the refrigerated storage chamber 30 has ports for delivery of beverages through a beverage port 31 and foods through a food port 32, inside the food preparation chamber 35. The beverages are fed by means of one or more gravity-feed beverage (e.g., canned or bottled beverages) feed mechanisms 33, which may be automatically triggered to deliver a selected beverage. Other bottled, canned or cylindrical containers may be likewise delivered by this mechanism 33. Foods are delivered to the food port 32 by a conveyor 34. The conveyor may be a sequential feed or ransom-access device, allowing a single food type or a variety of products to be fed. The beverage area and food storage area are stocked by means of doors 36 which are locked and provided with sensors 37, 38 to detect unauthorized access.

Figure 5:
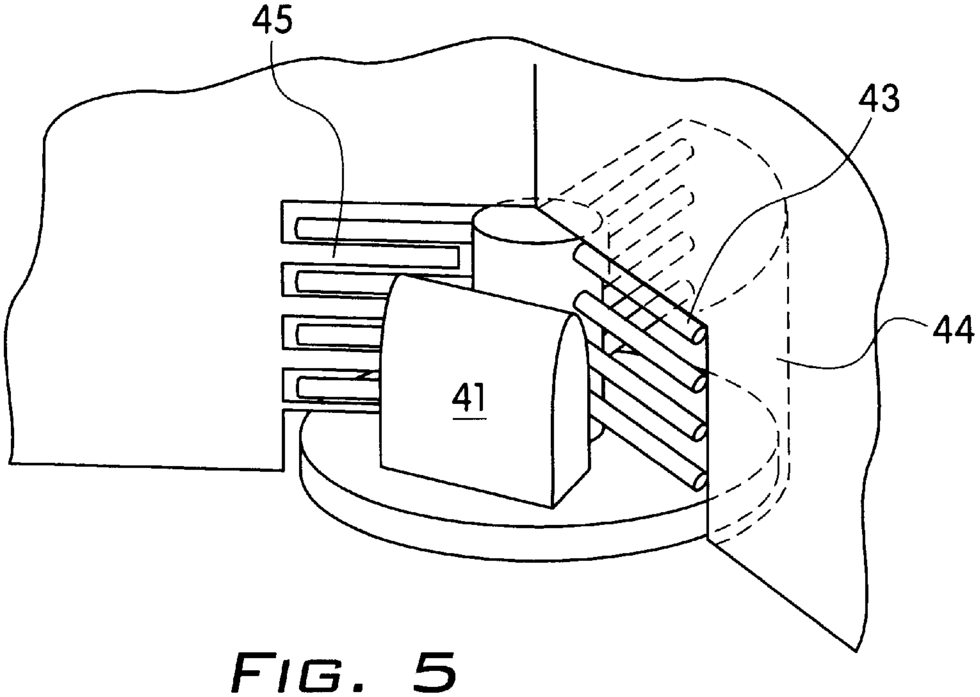
FIG. 5 is a top perspective view of a turnstile exit port for delivering items from a vending system.

FIG. 5 shows a turnstile embodiment for the food delivery system, located within the fixed enclosure 40 of the food preparation area. The food item 41 is placed on a unidirectional rotating tray 42 having a set of radially projecting parallel bar partitions 43. The partitions 43 fit within a partial cylindrical section 44 on one side, and a set of protrusions 45 corresponding to the spaces between the partitions 43. In this manner, the food 41 may only pass out of the fixed enclosure 40, and will not be able to be inserted therethrough.

Figure 6:
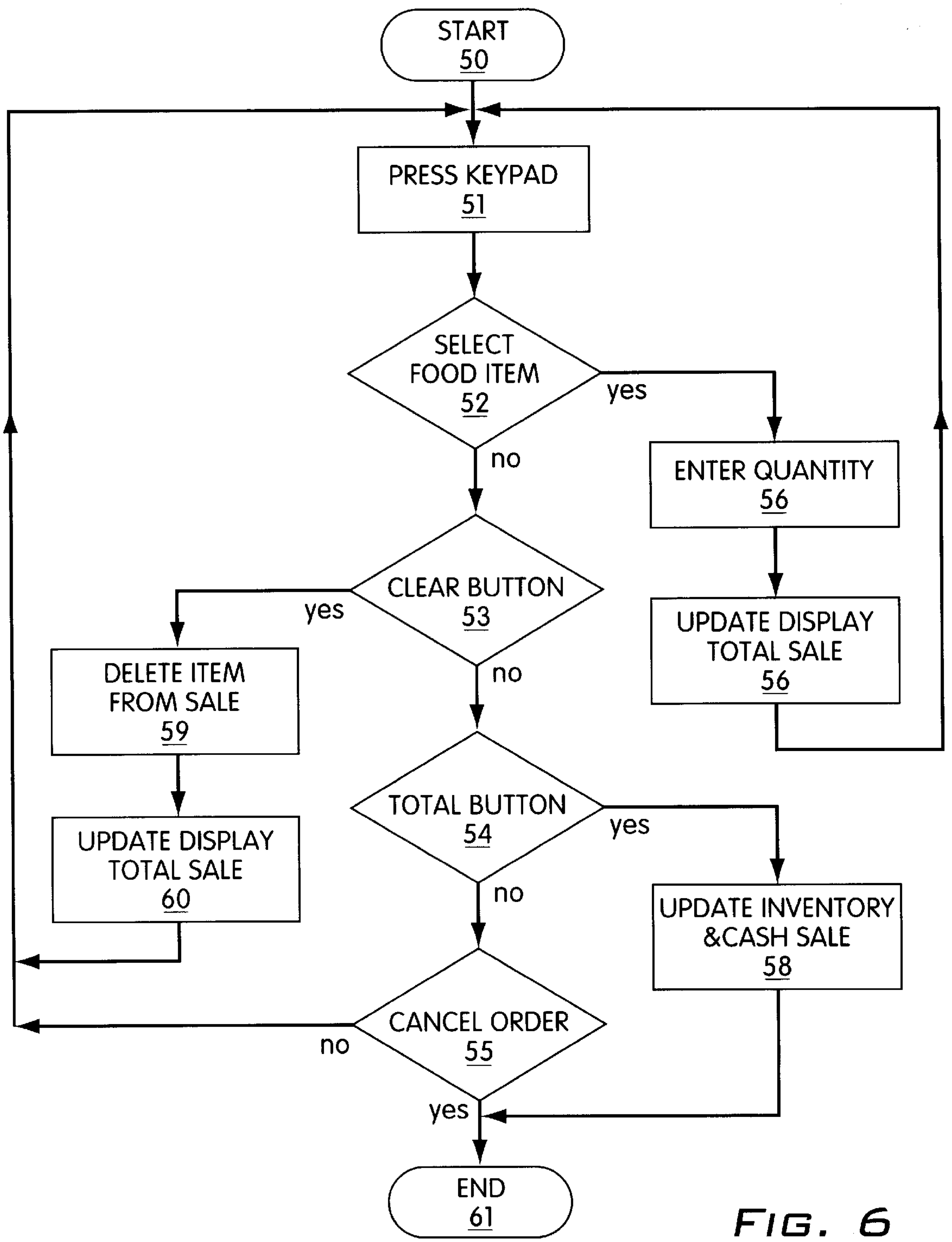
FIG. 6 is a flow diagram detailing an inventory and sales monitoring routine.

FIG. 6 shows a flow diagram of a sales and monitoring system. The user initiates the process by depressing a key 51 on the keypad. A food item is selected 52. If a partially completed transaction is voided, a clear button is pressed 53, any amounts included in the sale price for that item are deducted 59, and the total sale price is updated 60. If a food item is selected, the quantity is entered 56, and the total sale price is updated 57. After the last item is selected, the "Total" button is depressed 54, and the total amount due is displayed, the food dispensed, and the inventory and cash register amounts updated 58. If the total order is to be voided, a cancel order button is depressed 55.

Figure 7:
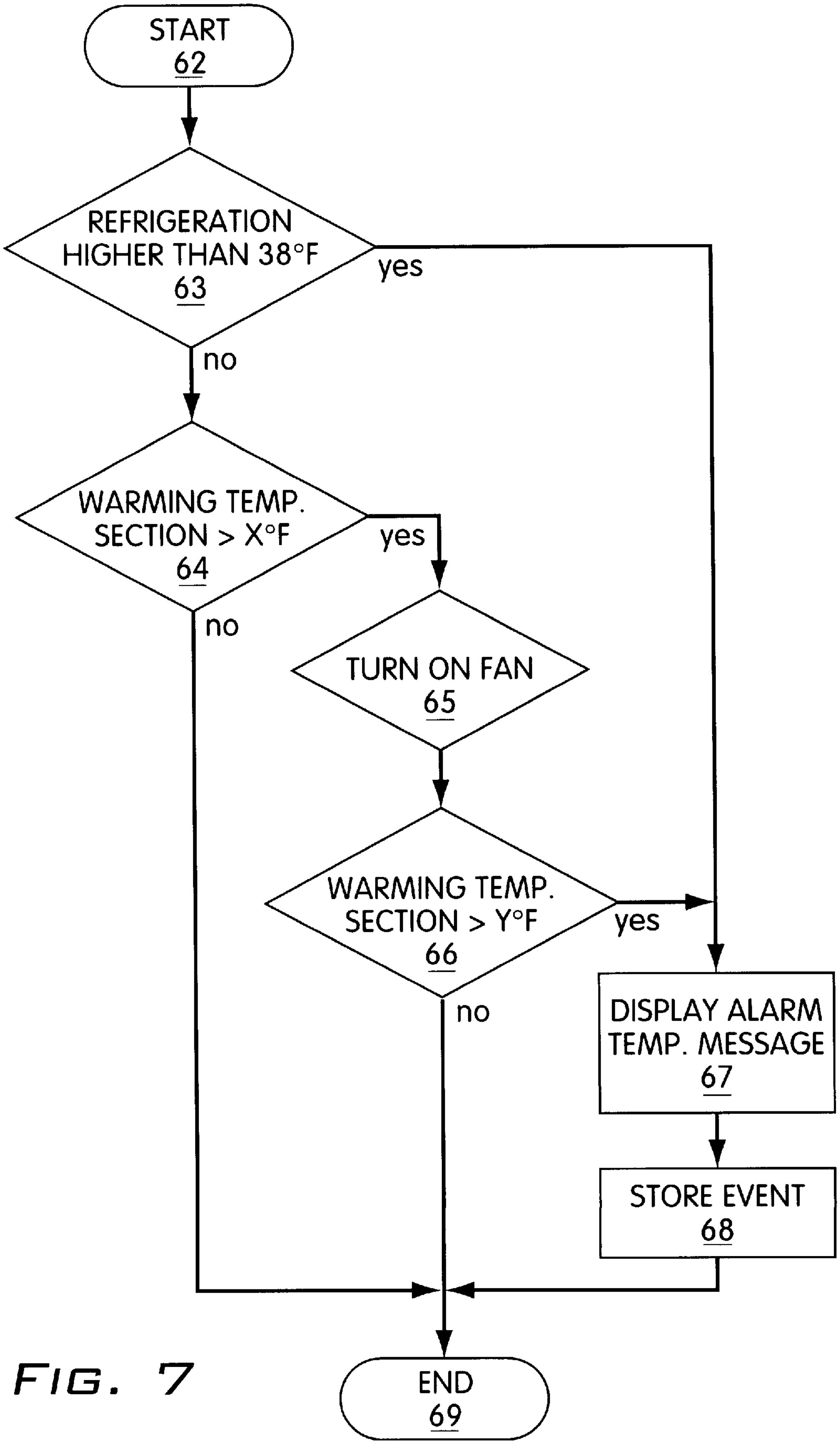
FIG. 7 is a flow diagram showing a temperature monitoring routine.

FIG. 7 shows a temperature monitoring routine for the vending system. The storage compartment temperature is measured 63 to determine whether it is below 38F. If not a temperature alarm message is provided 67, and a record of the event stored 68. In the warming section, a range of temperatures is maintained, e.g., between X and Y degrees, for example 170–180F. If the temperature is above a first threshold temperature 64, a fan is activated 65. If the temperature is above a second threshold temperature 66, the temperature alarm message is provided 67 and a record of the event recorded 68. Additionally, if the warmer is inoperative, a further alarm message is generated, not shown in FIG. 7

Figure 8:
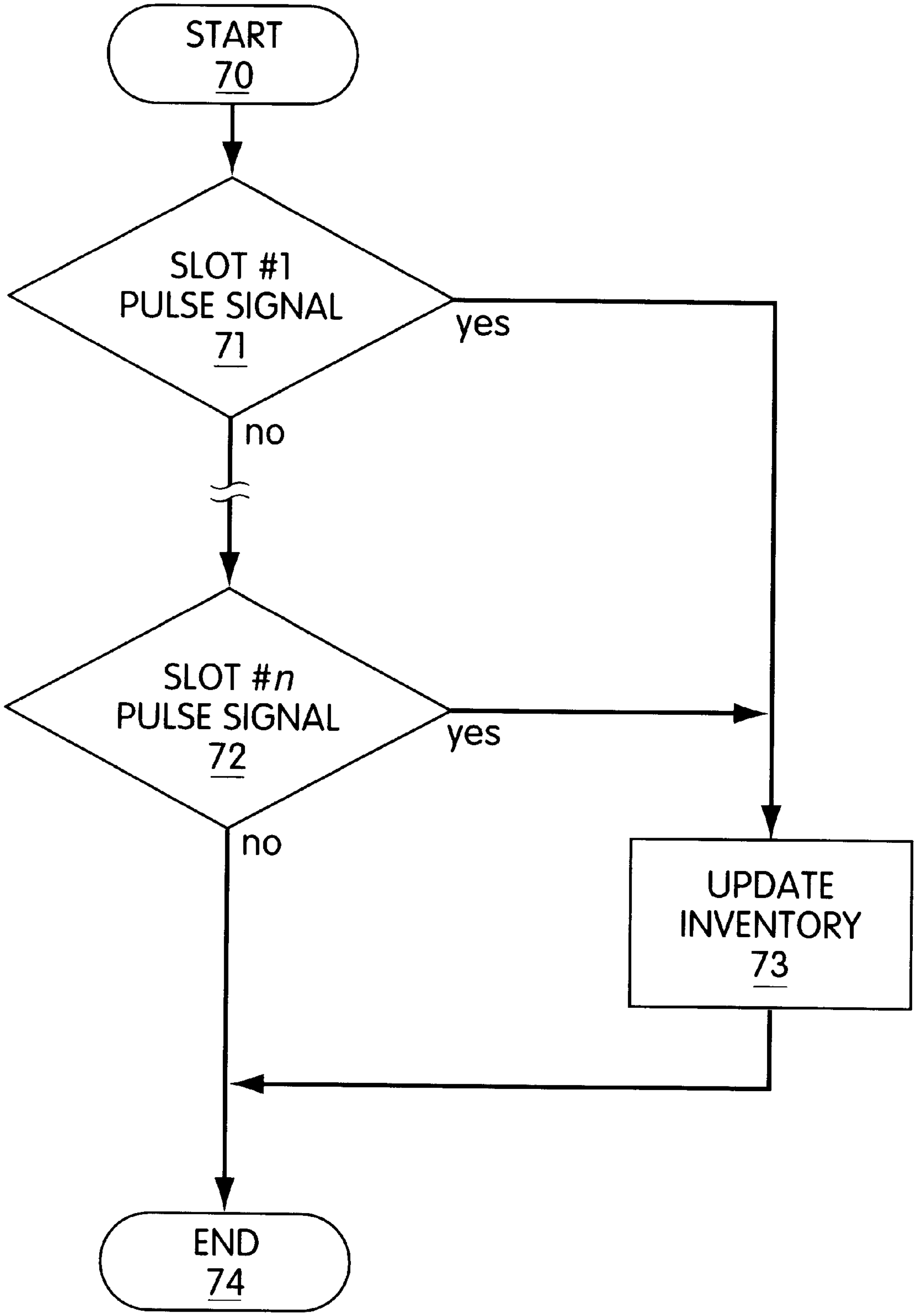
FIG. 8 is a flow diagram showing an inventory tracking subroutine.

FIG. 8 shows an inventory tracking subroutine. For each available food slot within the storage chamber, a sensor signal may be provided. As foods are removed from respective slots, the sensor signal is detected 71, 72. These sensor signals are received by the central control and stored inventory data is updated 73.

Figure 9:
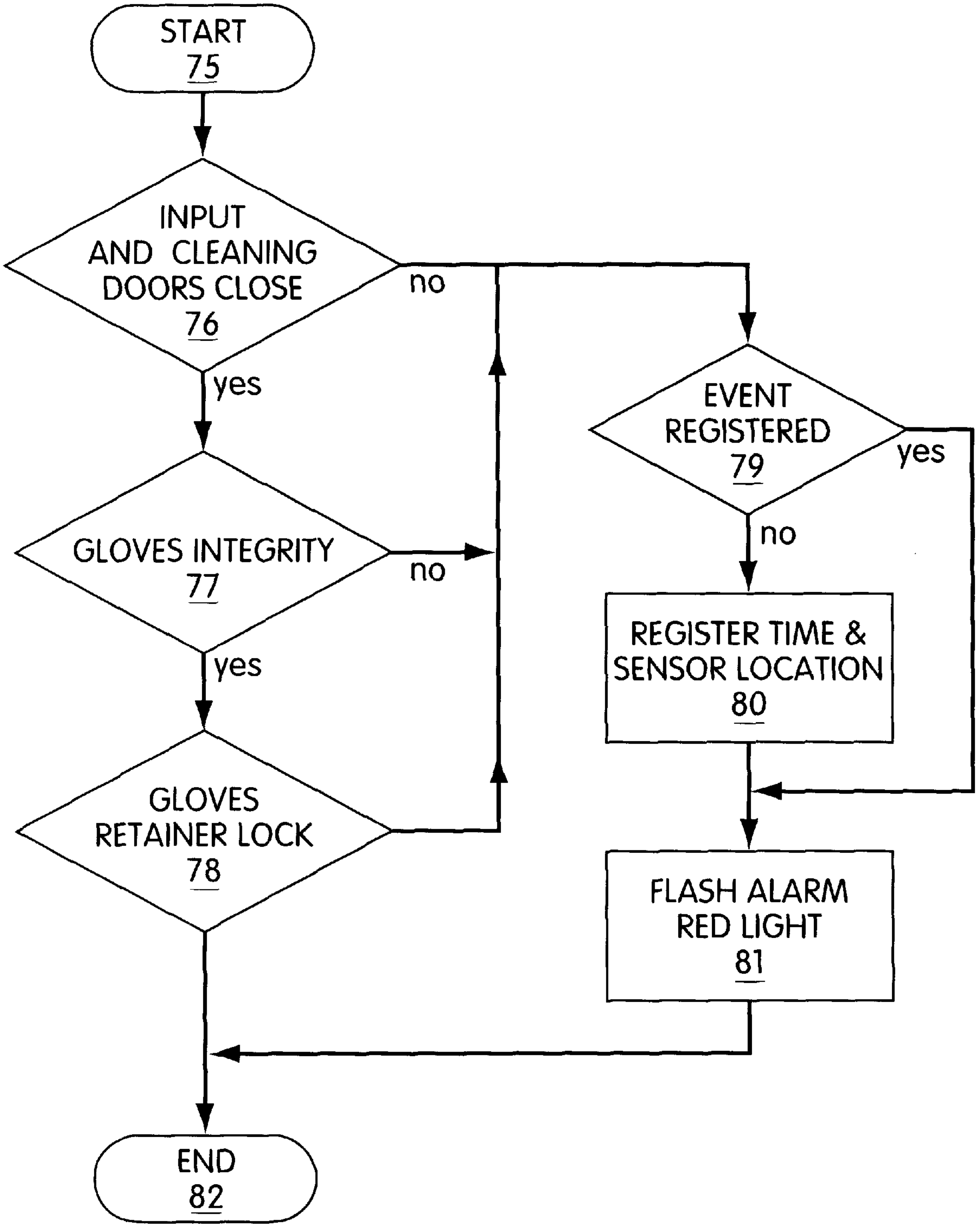
FIG. 9 is a flow diagram showing a security routine.

FIG. 9 shows a flow diagram of a security routine for the vending system. After the system is cleaned and restocked, the closing of the doors is detected 76. If the doors are thereafter opened without deactivating the security system 79, the time and sensor location which generated the alarm event is registered 80, and the alarm is activated 81, e.g., by flashing a red light. Where glove integrity sensors are provided, the integrity of the gloves are sensed 77 to determine a breach in the gloves, which is likewise processed to determine authorization 79, registered 80 and enunciated as an alarm 81. Further, the glove retainer mechanism is monitored for breach 78, which is likewise processed to determine authorization 79, registered 80 and enunciated as an alarm 81.

Figure 10:
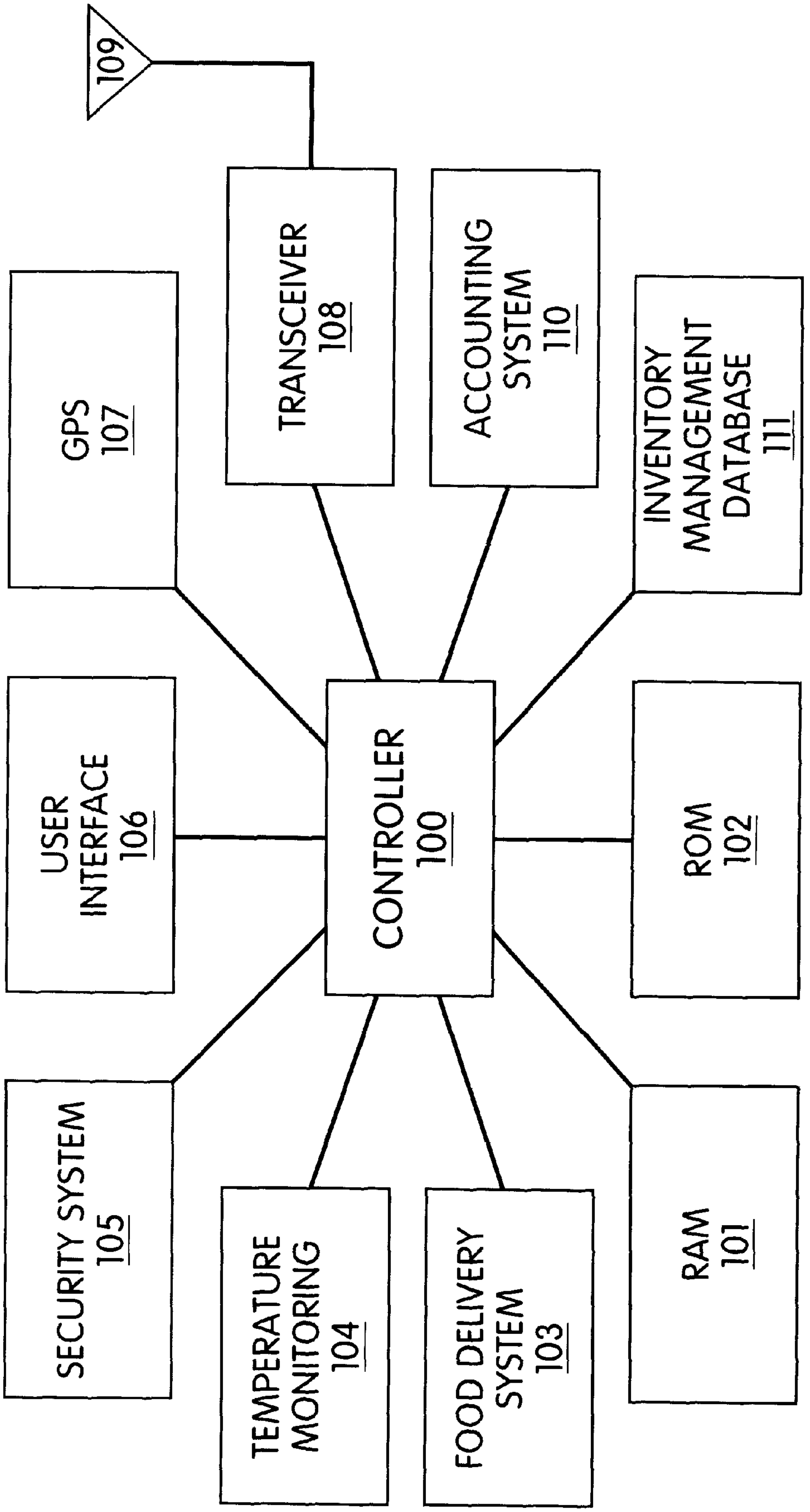
FIG. 10 is a block diagram showing elements of the control system.

FIG. 10 shows a block diagram of the control system. A controller 100, having nonvolatile program memory 102 and rewritable data memory 101 controls the vending system. The food delivery system is controlled by element 103 which includes, for example, solenoids, sensors, motors and the like. The various heating and cooling functions are controlled by the temperature monitoring system 104. Security of the system, for example to detect breaches of system integrity, is controlled by a security system 105. The security system, amount other elements, may be implemented as a software construct within the controller 100, and need not represent specific or dedicated hardware. The user interface 106 is provided for security codes, user input, alarm outputs, and information display. An optional element, the GPS receiver 107, allows a transceiver 108 to transmit, through an antenna 109, a location of a mobile vending cart to a central location, for example to locate the system for remediation of an alarm condition, restocking, pickup at the end of a shift, or the like. Other information may also be communicated by the transceiver 108, such as credit card authorizations, inventory levels, alarm conditions, and the like. The value of transactions is recorded in an accounting system 110, and the inventory levels are tracked by an inventory management system 111, which, as with the security system, primarily represents a software constructs.

There has thus been shown and described novel food vending systems and methods which fulfill all the objects and advantages sought therefor. Many changes, modifications, variations, combinations, subcombinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A food vending system, comprising:

(a) a secure bulk food storage area, having a bulk food storage space;

(b) a secure food preparation area wherein a portion of bulk food is received from said secure bulk food storage area and manipulated;

(c) an access port in said secure food preparation area, having physical barrier for preventing contamination of said secure food preparation area while permitting manual manipulation of the portion of bulk food therein; and (d) a unidirectional delivery port for external delivery of manipulated food, wherein said secure bulk food storage area and said secure preparation area are tamper evident.

2. The system according to claim 1, wherein said secure bulk food storage area is provided with a locked access door for restocking.

3. The system according to claim 1, wherein said secure food preparation area is provided with a locked access door for cleaning.

4. The system according to claim 1, further comprising a sensor system for detecting unauthorized access to said secure bulk food storage area and said secure food preparation area.

5. The system according to claim 4, wherein said system comprises a control for detecting an authorized access request, said authorized access request comprising a secure code transmitted to said control.

6. The system according to claim 4, wherein said system for detecting unauthorized access comprises an alarm having a reset, said reset being activated by a secure code transmitted to said control.

7. The system according to claim 5, wherein said code is transmitted by means selected from the group consisting of a wired interface, a radio frequency interface, an infrared interface, a voice interface and a biometric detection interface.

8. The system according to claim 6, wherein said code is transmitted by means selected from the group consisting of a wired interface, a radio frequency interface, an infrared interface, a voice interface and a biometric detection interface.

9. The system according to claim 1, wherein said secure bulk food storage area is secure against unauthorized food substitution.

10. The system according to claim 1, wherein said secure bulk food storage area is adapted to store and separately retrieve a plurality of different types of foods, each being separately retrievable.

11. The system according to claim 1, further comprising a database storing information relating to an operation of the system.

12. The system according to claim 1, wherein said physical barrier allows direct manual manipulation of the portion of bulk food in said secure food preparation area.

13. The system according to claim 1, wherein said physical barrier comprises at least one glove extending into said secure food preparation area.

14. A method for vending food, comprising:

(a) providing a secure bulk food storage area, having a bulk food storage space from which selected portions are delivered;

(b) manually manipulating delivered food portions in a secure food preparation area while preventing contamination thereof; and (c) externally expelling the manipulated food from the secure food preparation area through a unidirectional delivery port, wherein said secure bulk food storage area and said secure preparation area are isolated from the use and tamper evident.

15. The method according to claim 14, further comprising the step of providing said secure bulk food storage area with a locked access door for restocking.

16. The method according to claim 14, further comprising the step of providing said secure food preparation area with a locked access door for cleaning.

17. The method according to claim 14, further comprising the step of detecting unauthorized access to said secure bulk food storage area and said secure food preparation area.

18. The method according to claim 17, further comprising the step of detecting an authorized access request, said authorized access request comprising a secure code transmitted to said control.

19. The method according to claim 17, further comprising the step of detecting unauthorized access and producing a resettable alarm, said alarm being reset by a secure code transmitted to said control.

20. The method according to claim 18, further comprising the step of transmitting said secure code by means selected from the group consisting of a wired interface, a radio frequency interface, an infrared interface, a voice interface and a biometric detection interface.

21. The method according to claim 19, further comprising the step of transmitting said secure code by means selected from the group consisting of a wired interface, a radio frequency interface, an infrared interface, a voice interface and a biometric detection interface.

22. A system for ensuring compliance with dietary laws in a food vending device, comprising:

(a) a secure food storage chamber;

(b) a food preparation chamber, receiving food from said storage chamber, for manually controlled manipulation thereof through an access port having a contamination barrier, said food storage chamber and said food preparation chamber being physically isolated from external contaminants; and (c) an external unidirectional food exit port from said food preparation chamber.

23. The system according to claim 22, wherein said contamination barrier comprises at least one glove extending therein.

24. The system according to claim 22, further comprising a mechanism for limiting access from said food preparation chamber to said food storage chamber.

25. The system according to claim 22, further comprising an intrusion detection system, storing an indication of an intrusion condition.

26. The system according to claim 25, wherein said intrusion detection system comprises an electronic control and an interface for receiving an intrusion condition reset code.

27. A food vending system ensuring food environment integrity, comprising:

(a) a multiserving food storage area;

(b) a food preparation area, adapted for receipt and manual manipulation, through a barrier, of a serving of food from the multiserving food storage area;

(c) a user interface for manually controlled manipulation of food without direct human contact therewith in said food manipulation area; and (d) a delivery port for external delivery of a manipulated serving of food, wherein said food storage area and said food preparation area are environmentally protected.

* * * * *